United States Patent [19]

Cristol et al.

[11] Patent Number: 4,614,642

[45] Date of Patent: Sep. 30, 1986

[54] METHOD OF PRODUCING AN ALUMINIUM TRIHYDROXIDE WITH A LARGE, EVEN PARTICLE SIZE

[75] Inventors: Benoît Cristol; Jacques Mordini, both of Aix-en-Provence, France

[73] Assignee: Aluminum Pechiney, Paris, France

[21] Appl. No.: 747,045

[22] PCT Filed: Sep. 4, 1984

[86] PCT No.: PCT/FR84/00195

§ 371 Date: Jun. 6, 1985

§ 102(e) Date: Jun. 6, 1985

[87] PCT Pub. No.: WO85/01040

PCT Pub. Date: Mar. 14, 1985

[30] Foreign Application Priority Data

Sep. 5, 1983 [FR] France .................................. 83 14294

[51] Int. Cl.[4] .............................................. C01F 7/06
[52] U.S. Cl. ........................................ 423/127; 423/121
[58] Field of Search ..................... 423/121, 127, 129; 23/301, 305 A

[56] References Cited

U.S. PATENT DOCUMENTS

| | | | |
|---|---|---|---|
| 4,049,773 | 9/1977 | Mejdell et al. ................ | 23/305 A |
| 4,234,559 | 11/1980 | Tschamper ..................... | 423/121 |
| 4,305,913 | 12/1981 | Anjier ............................ | 423/121 |
| 4,311,486 | 1/1982 | Yamasla et al. ............... | 423/121 |
| 4,364,919 | 12/1982 | Yamasla et al. ............... | 423/121 |
| 4,511,542 | 4/1985 | Anjier et al. .................. | 423/121 |
| 4,512,959 | 4/1985 | Pohland et al. ............... | 423/121 |

Primary Examiner—H. T. Carter
Attorney, Agent, or Firm—McDougall, Hersh & Scott

[57] ABSTRACT

A method of decomposing a super-saturated solution of alkali metal aluminate Ld from the Bayer process, by introducing primer Sa and forming a suspension with a high content of dry material, of at least 700 g/l of alkali metal aluminate solution to be decomposed, is characterized in that, for the purpose of obtaining $Al(OH)_3$ with a large, even particle size, a zone (Zs) for separating particularly fine solid particles of $Al(OH)_3$ is formed in decomposition zone (B) comprising a cascade of n stages of the Bayer process, the separating zone being fed with at least part $L(n-3)1$ of the flow of suspension $Ln-3$ circulating in said zone (B), from which a fraction $LS_1$ is extracted, containing at least 5% of the total number of fine particles with a maximum diameter of 40 microns present in the flow $Ln-3$, while the residual suspension $LS_2$ emerging from the separating zone Zs is recycled to zone (B), then the fraction $Ls_1$ is treated by a known means for reducing the number of fine particles by at least 50%, and is recycled to a stage in the Bayer process.

9 Claims, 3 Drawing Figures

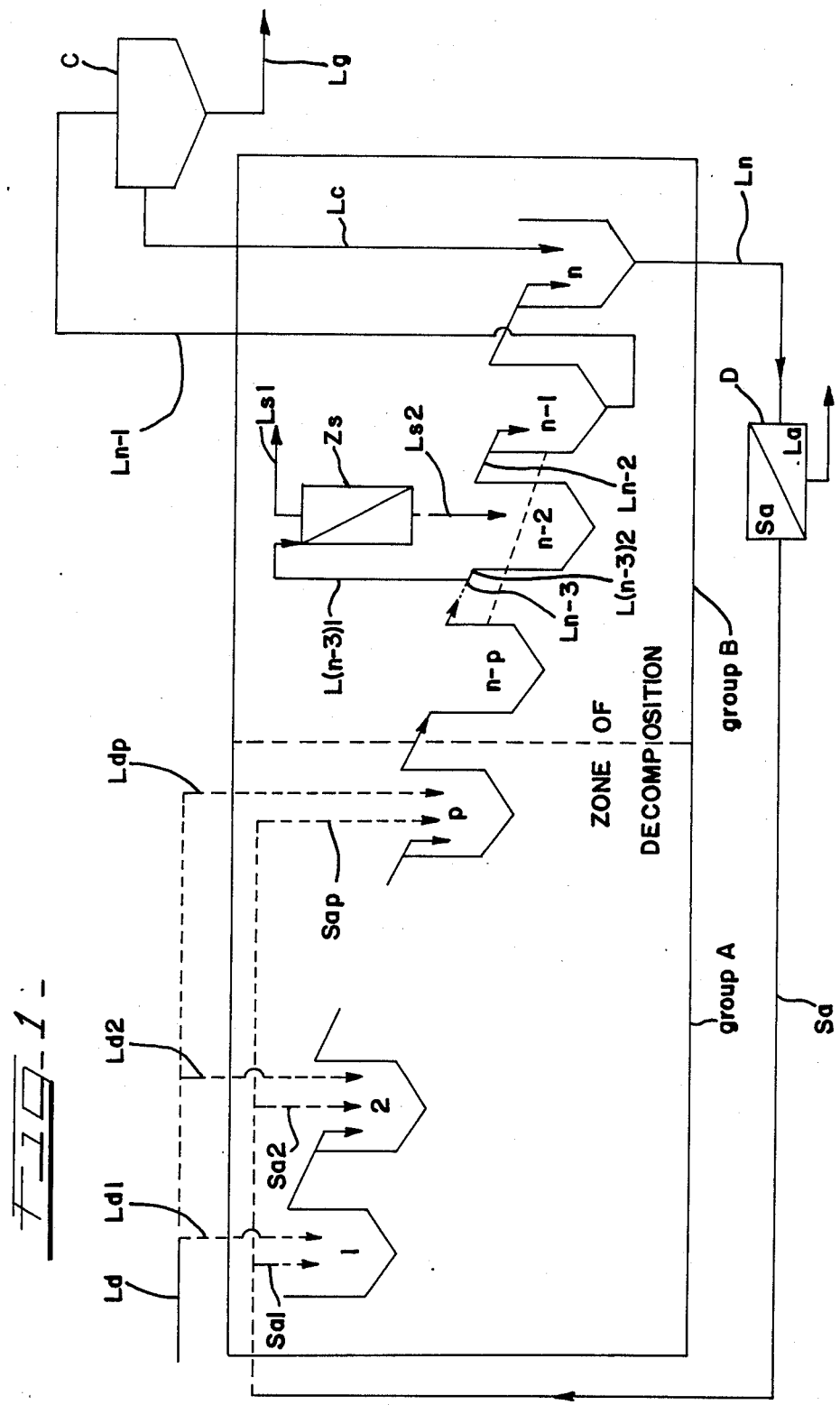

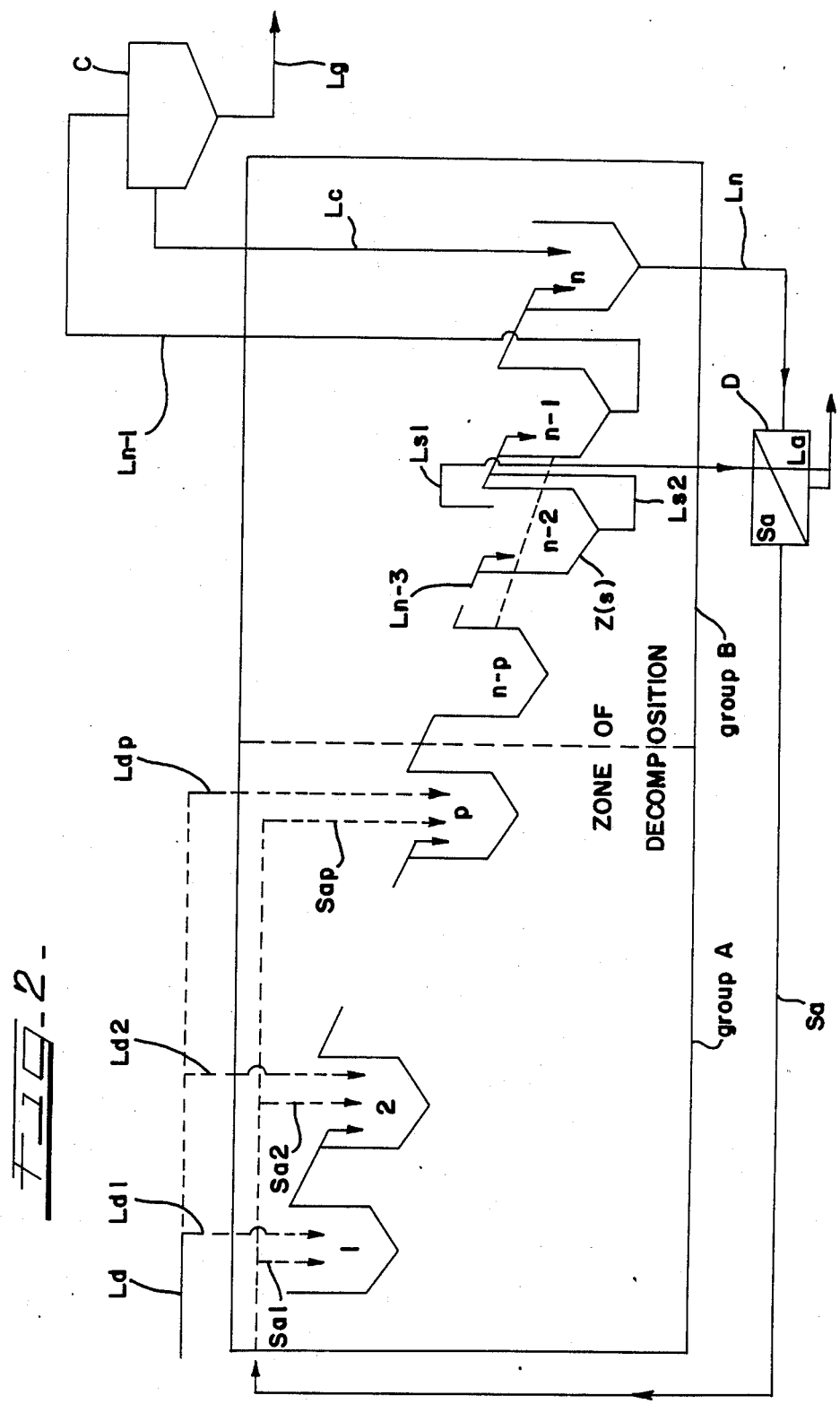

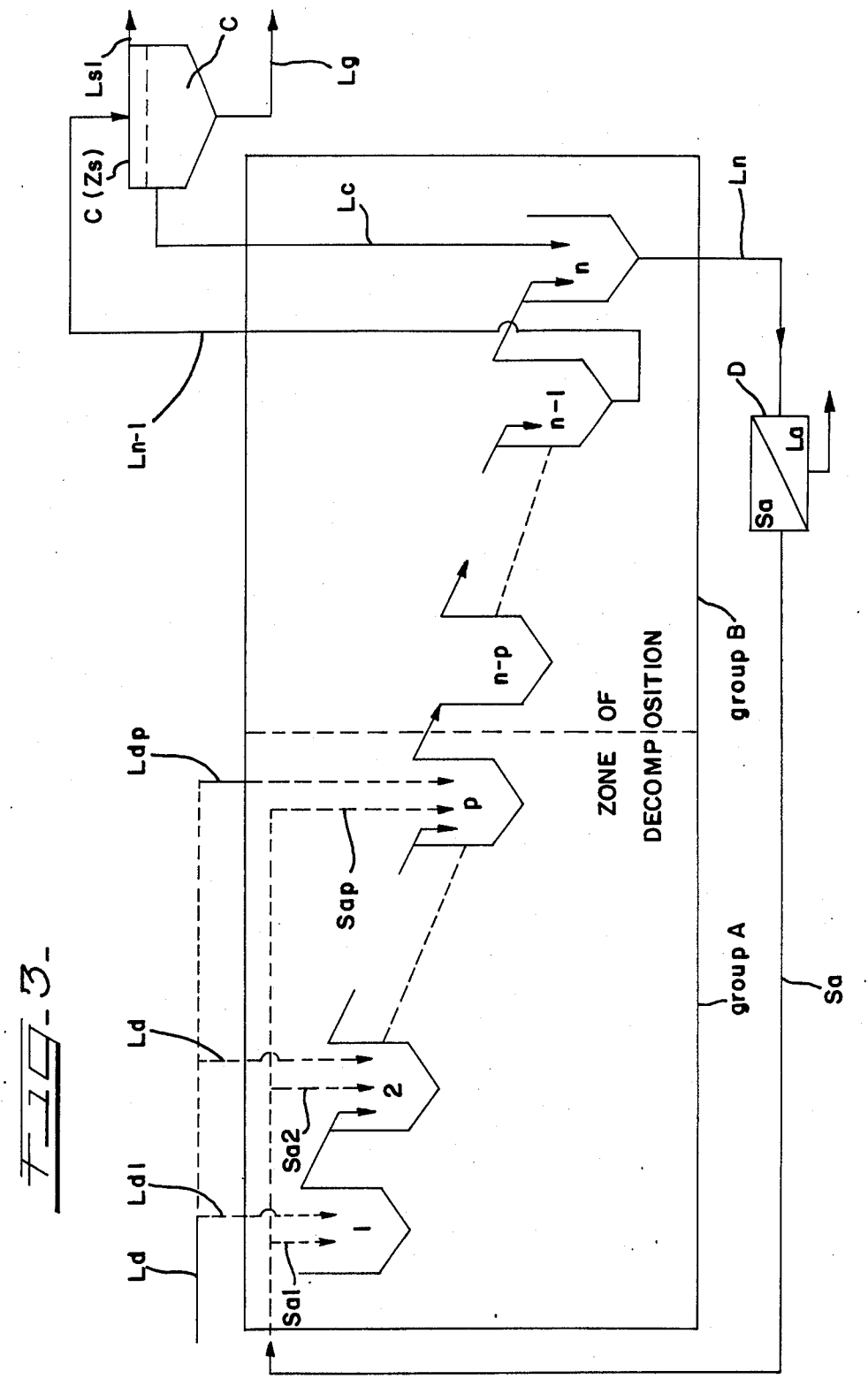

METHOD OF PRODUCING AN ALUMINIUM TRIHYDROXIDE WITH A LARGE, EVEN PARTICLE SIZE

The invention, which is an improvement to patent application No. 82 12412 filed July 8, 1982, concerns a highly productive method of precipitating Al(OH)$_3$, from a super-saturated solution of alkali metal aluminate obtained by the Bayer process of alkaline action on bauxites, wherein the introduction of primer results in an aluminium trihydroxide of large, even particle size, where a maximum of 10% of the particles produced have their smallest dimension less than 45 microns.

The Bayer process, which has been widely described in the specialised literature and is well known in the art, is the essential technique for producing alumina designed to be converted to aluminium by igneous electrolysis. In this process the bauxite is treated hot with an aqueous solution of sodium hydroxide at an appropriate concentration, thus making the alumina soluble and producing a super-saturated solution of sodium aluminate. After separation of the solid phase, comprising the unattacked residue (red mud) of the ore, the super-saturated solution of sodium aluminate is generally seeded with aluminium hydroxide, hereinafter referred to as "primer", in order to bring about the precipitation of an aluminium trihydroxide.

It is well known in the art that there are several different industrial methods of producing aluminium trihydroxide by alkaline action on bauxites in the Bayer process; these are normally divided into two categories, one known as the European process and the other as the American process.

In the European process the aluminium trihydroxide is precipitated in the course of the operation known as decomposition of an aqueous solution of sodium aluminate with a high concentration of caustic Na$_2$O, generally containing from 130 to 170 grammes of Na$_2$O per liter of sodium aluminate solution to be decomposed. The expression "concentration of caustic Na$_2$O should be understood as referring to the total quantity of Na$_2$O expressed in grammes per liter in the sodium aluminate solution to be decomposed, in the bonded form of sodium aluminate and in the free form of sodium hydroxide. In this process a quantity generally ranging from 350 g/l to 600 g/l of Al(OH)$_3$ acting as primer is added to the sodium aluminate solution to be decomposed, decomposition generally taking place at a maximum temperature of 55° C. A process of this type gives high alumina productivity, of up to 80 g of Al$_2$O$_3$ per liter of sodium aluminate solution, but the aluminium trihydroxide thus produced generally has fine particles and, when calcined, gives an alumina of a fineness which at the present time is considered troublesome for igneous electrolysis.

In the American process the aluminium trihydroxide is precipitated by decomposing an aqueous solution of sodium aluminate with a low concentration of caustic Na$_2$O, not exceeding 110 g of Na$_2$O per liter of sodium aluminate solution to be decomposed. This is done by adding a smaller quantity than in the European process of Al(OH)$_3$ acting as primer to the sodium aluminate solution to be decomposed; the quantity is generally from 100 g/l to 200 g/l of the aluminate solution to be decomposed. On the other hand decomposition takes place at a higher temperature, such as 70° C. All these operating conditions combined lead to the production of an aluminum trihydroxide of a larger particle size than that obtained by the European process; after grading and calcination it gives an alumina of a particle size known as "sandy coarse", which is at present required for igneous electrolysis. However, the operating conditions have the adverse effect of reducing Al$_2$O$_3$ productivity, which is much lower than in the European process, generally about 50 g of Al$_2$O$_3$ per liter of aluminate solution in the production of a sandy coarse alumina. Attempts to improve productivity by reducing the decomposing temperature and adding a larger quantity of Al(OH)$_3$ acting as primer to the sodium aluminate solution to be decomposed are known to have culminated in the disappearance of the sandy coarse type alumina and the appearance of an alumina with a smaller particle size.

As evidenced by the large number of publications in the field, a large amount of research has been done over a long period, based both on the American and the European process, in an attempt to find a method of obtaining aluminium trihydroxide with a large particle size, which also has the productivity of the European process.

A first process described in U.S. Pat. No. 2,657,978 for the purpose of encouraging an increase in productivity of large particle aluminium hydroxide, concerns introducing aluminium trihydroxide acting as primer in two stages; the first stage comprising introducing only sufficient primer to give crystals of coarse granulometry, and a further quantity of primer being added at the second stage. On the basis of the results given however, the increase in productivity appears to be very slight and consequently of little industrial interest.

Another process, described in U.S. Pat. No. 3,486,850 and aiming to increase both productivity and the size of the particles of aluminium trihydroxide precipitated from the super-saturated sodium aluminate liquor, comprises continuously introducing aluminium trihydroxide, acting as primer, into the sodium aluminate solution circulating in a decomposition zone with a plurality of stages, and carrying out intermediate cooling between any two stages of decomposition. However, the process is unsuitable for production on an industrial scale by reason of the narrow temperature range in which it has to take place, and also by reason of the small gain in productivity which results from applying it.

With the dual purpose of improving the yield from precipitation and the particle size of the aluminium hydroxide produced, another process described in French Pat. No. 2 440 996 recommends decomposing the super-saturated solution of sodium aluminate in two phases.

The first phase of decomposition comprises adding a controlled quantity of a suspension of fine primer to the sodium aluminate solution, and takes place at a temperature between 77° and 66° C. Then the second phase of decomposition treats the cooled suspension from the first phase by introducing sufficient primer of coarser particle size, so that the total quantity of primer introduced in both phases is at least 130 g of aluminium trihydroxide per liter of solution to be composed; the quantity of primer is generally not more than 400 g/l. However, the improvement obtained over the American process has more to do with increasing productivity than obtaining a truly coarser particle size. It appears to be the simultaneous consequence of super-saturating the sodium aluminate solution to be decomposed, which depends on the action on the bauxite, and of its particularly long dwell time (45 to 100 hours) in the decomposition zone. On the other hand a larger total quantity of primer added to the solution is not found to have any specific action.

Whereas the process described in French Pat. No. 2 440 916 appears to recommend using a larger quantity of recycled primer, but not more than 400 g/l of sodium aluminate solution to be decomposed, for the purpose of increasing productivity and increasing the size of the particles produced, U.S. Pat. No. 4,305,913 describes the use of a large quantity of primer in the European process as harmful, and goes as far as saying that it results in the production of an aluminium trihydroxide with a small particle size. The patent therefore recommends a different method of decomposing a super-saturated sodium aluminate solution in stages, comprising a first, agglomerating stage, a second stage of enlarging the agglomerates, and finally a third stage of producing the primer. The three stages are separate but related; the temperature at which the process takes place is between 74° and 85° C. and the quantity of primer introduced is between 70 and 140 g/l of sodium aluminate solution to be decomposed. But the process does not provide a solution more favourable to experts since, although it produces an alumina of an apparently favourable particle size, it still has low productivity as compared with a European process.

Finally, another process for producing aluminium trihydroxide with coarse and fine particles simultaneously, described in Japanese Pat. No. 82-11 821, proposes decomposing the sodium aluminate liquor in two successive stages. The first stage, that of production or coarse particles, comprises putting all the sodium aluminate liquor to be decomposed into contact with a primer for 11 hours at 70° C., the primer consisting of very fine graded particles of aluminium trihydroxide emanating from the second stage, then passing the suspension obtained into a grading zone which gives aluminium trihydroxide with coarse particles and a suspension of fine particles which is passed onto the second stage. The second stage, during which the decomposition of the sodium aluminate is continued (at 65° C.), comprises adding a very fine, recycled primer to the suspension of fine particles from the first stage, then passing them into a grading zone, giving production of fine particles and a suspension of very fine particles which act as primer during both stages, whereas the decomposed liquid phase is removed. A process of this type unfortunately gives low aluminium trihydroxide productivity (63.5 g of $Al_2O_3$ per liter of aluminate liquor to be decomposed), relative to the European process, and production mainly of fine particles of aluminium trihydroxide, whereas igneous electrolysis of alumina uses alumina of the sandy coarse type, that is to say, with large particles.

Thus it is apparent from the various known publications that many means have been applied in an attempt to obtain a method of decomposing a super-saturated solution of sodium aluminate which will combine the single features found in the American and European processes, that is to say, which will make it possible to produce an alumina of a large particle size (sandy coarse type) with good productivity. However, experts must concede that the methods proposed provide incomplete and unsatisfactory solutions since, in order to arrive at an alumina of an acceptable particle size, it is generally necessary to sacrifice the high alumina productivity that experts can no longer accept on an industrial scale. (sic)

Owing to these disadvantages Applicants, in the course of further research, have described a process in patent application No. 82-12412, the process being for the decomposition of a super-saturated solution of alkali metal aluminate obtained by the Bayer process of alkaline action of bauxites, by incorporating in said solution a quantity of primer which has never before been used and which in prior art was considered harmful, the purpose of the process being to obtain on an industrial scale both high productivity of aluminium trihydroxide, by improving the yield from the decomposition of alkali metal aluminate, and a crystallized aluminium trihydroxide of a large particle size, in which at the most 10 percent of the particles produced have their smallest dimension less than 45 microns.

The method of patent application No. 82-12412, which comprises putting all the primer used into contact with all the super-saturated solution of alkali metal aluminate obtained by the Bayer process, is distinguished in having the following steps:

(a) in the decomposition zone of the Bayer process, comprising a cascade of n stages, a suspension is formed containing a large quantity of dry material, at least 700 g/l of alkali metal aluminate solution to be decomposed in at least one stage, by introducing primer in the form of crystals of aluminium trihydroxide of non-selected granulometry;

(b) after a dwell time in the decomposition zone at a maximum temperature chosen within the range from 50° to 80° C., until a weight ratio of dissolved $Al_2O_3/Na_2O$ of a maximum of 0.7 is obtained, a fraction is taken out, comprising a maximum of 50% by volume of the suspension containing a large quantity of dry material circulating in the decomposition zone;

(c) then said fraction, after being thus removed, is placed in a grading zone from which:

$C_1$—the granular part separated is extracted and forms the coarse grained $Al(OH)_3$ product and $C_2$—the other part separated, forming a suspension, is withdrawn from the grading zone and combined with the remaining fraction of the suspension circulating in the decomposition zone which has not been graded;

(d) the suspension resulting from the operation carried out in $C_2$ is subjected to solid-liquid separation, the solid phase separated forming the primer of aluminium trihydroxide of non-selected granulometry, which is recycled into the decomposition zone of the Bayer process.

From that time Applicants have continued with their research and found and perfected a process which is an improvement to the one mentioned above. It reduces the number of very fine particles of aluminium hydroxide circulating in the decomposition zone and leads (a) to better control of the granulometry of the large particles of aluminium trihydroxide and (b) to a marked improvement in the productivity of said aluminium trihydroxide.

According to the invention, which is an improvement to patent application No. 82-12412, the method of decomposing a super-saturated solution of alkali metal aluminate obtained by the Bayer process of alkaline action on bauxites, comprising at least one decomposition zone having a cascade of n stages, with the introduction of primer and the formation of a suspension containing a large amount of dry material, at least 700 grams per liter of alkali metal aluminate solution to be decomposed, is characterised in that, for the purpose of obtaining an aluminium trihydroxide with a large, even particle size, in which a maximum of 10% of the particles produced have their smallest dimension less than 45 microns, a zone for separating out of particularly fine solid particles of aluminium trihydroxide is formed in at least one of the decomposition zones of the Bayer process comprising the cascade of n stages. This separating zone is supplied with at least part of the flow of suspension circulating in said decomposition zone. A fraction containing at least 5% of the total number of said fine particles with a maximum diameter of 40 microns which are present in the flow circulating in the decomposition zone is extracted from the separating zone, while the residual suspension leaving the separating zone is returned to the decomposition zone. The fraction containing the fine particles thus extracted is treated to reduce by at least 50% the number of fine particles present in said fraction and the fraction is recycled, after said treatment, to at least one stage of Bayer process.

To facilitate the subsequent description of the invention, it should be recalled that the content of dry material in the suspension, created by adding the primer to the super-saturated solution of alkali metal aluminate to be decomposed, is expressed in grammes of dry aluminium trihydroxide per liter of said solution, while the caustic $Na_2O$ concentration in grammes per liter of the sodium aluminate solution is known to express the total quantity of $Na_2O$ present in said solution in the bonded form of sodium aluminate and in the free form of sodium hydroxide.

Now that these definitions have been recalled the invention will be described with reference to a general diagram of an installation for producing aluminium trihydroxide according to the invention, which is shown in FIG. 1.

In the figure the zone for the decomposition of the sodium aluminate solution has n stages of decomposition, comprising a first group (A) of p stages and a second group (B) made up of (n−p) stages in the decomposition of the alkali metal aluminate solution.

The super-saturated alkali metal aluminate solution $L_d$ to be decomposed may all be incorporated in at least one of the decomposition stages of groups (A) or (B), for example $L_{d1}, L_{32} \ldots, L_{dp}$ in the case of group (A). Equally, part of the solution may be incorporated in at least one of the decomposition stages of group (A) and the other part in at least one of the decomposition stages of group (B). Similarly all or part of the aluminium trihydroxide of non-selected granulometry acting as primer may be incorporated with the same distribution as for the aluminate solution, e.g. $S_{a1}, S_{a2} \ldots, S_{ap}$ in the case of group (A).

In the course of their research Applicants have proved that it is possible to form a suspension containing a large quantity of dry material, at least 700 g/l of alkali metal aluminate to be decomposed, by adding primer in the form of crystals of aluminium trihydroxide of non-selected granulometry, that is to say with a wide range of particle sizes; a suspension of this type both provides a large particle alumina of the "sandy coarse" type and gives high productivity.

The concentration of dry material in the suspension of primer formed at at least one stage of the decomposition zone may be chosen between 800 and 2000 grammes of $Al(CH)_3$ of non-selected particle size, per liter of sodium aluminate solution to be decomposed.

The suspension of primer containing a large quantity of dry material may preferably take up at least (n−1) stages of the decomposition zone, and it may be desirable for the suspension to take up the last (n−1) stages thereof. In the latter case group (A) of the decomposition zone then consists of one stage.

However, it may be helpful for the suspension of primer formed, with its high content of dry material, to occupy the n stages of decomposition. The suspension is then obtained by simultaneously placing all the primer and all the alkali metal aluminate solution to be decomposed in the first decomposition stage.

The suspension of primer formed, with its high content of dry material, stays in the decomposition zone from its formation. It is now at a maximum temperature chosen within the range from 50° to 80° C., for long enough to obtain a weight ratio (dissolved $Al_2O_3$)/(caustic $Na_2O$) of 0.7 at the maximum. The maximum temperature to which the suspension of primer is subjected in the decomposition zone is preferably chosen within the range from 50° to 68° C.

But when the maximum temperature of the suspension formed with a high content of dry material in the decomposition zone is chosen within the 60° to 80° C. range in at least one of the n stages of decomposition, it may prove important to carry out forced cooling of said suspension circulating in the n−1 other stages of decomposition, from the time when it leaves the decomposition stage in question, so that its maximum temperature after cooling is 60° C. at the most.

According to the invention the zone of separation ($Z_S$) for extracing a fraction of the particularly fine solid particles of aluminium trihydroxide is created between stages (n−p) and n inclusive, or else in substituted for one of these stages of decomposition in group (B). The separation zone ($Z_S$) may be supplied with at least part of the flow of the suspension created with a high content of dry material circulating in the decomposition zone, that is to say, by a more or less large portion or all of said flow.

In the case of FIG. 1 the separation zone ($Z_S$) is supplied from the part $L(n-3)_1$ of the flow of suspension $Ln-3$ circulating in the decomposition zone, while the other part $L(n-3)_2$ is fed into the next decomposition stage (n−2).

The fact that all or part of the flow, e.g. $Ln-3$, of the suspension formed with a high content of dry material circulating in the decomposition zone, is introduced into the separation zone ($Z_S$) makes it possible for at least 5% of the total number of fine particles, with a maximum diameter of 40 microns, present in the circulating flow to be extracted by the fraction $L_{S1}$, while the residual suspension $L_{S2}$ is returned to at least one stage of the decomposition zone, e.g. stage (n−2).

In some cases it may be desirable to extract 5 to 40% and preferably 10 to 20% of the total number of fine particles, with a maximum diameter of 40 microns, which are present in the flow circulating in the zone for the decomposition of the super-saturated solution of alkali metal aluminate.

The separating method carried out in the separating zone ($Z_S$) of the invention may be chosen from the group comprising decanting, cycloning, filtering and centrifuging, used either alone or in combination. For example two separating methods may be combined, such as decanting and cycloning or decanting and filtering.

The fraction $L_{S1}$ containing the fine particles thus extracted from the flow circulating in the decomposition zone is subjected to a known type of treatment, in order to reduce the number of fine particles by at least 50% before the fraction is recycled to at least one stage in the Bayer process.

The treatment may possibly comprise at least partially dissolving said particles, i.e. at least 50% of them. They may be dissolved e.g. at one of the well known stages of the Bayer process, such as when the decomposed and recycled alkali metal aluminate solution is evaporated, or when the ore is acted on or at the stage when the suspension resulting from action on the ore is expanded.

The treatment may equally consist of chemical agglomeration of the solid fine particles, so as to reduce their number by at least 50%. The agglomerated particles may subsequently be used e.g. as primer in at least one of the decomposition stages (1) to p of group (A).

Once the suspension formed with a high content of dry material has stayed the necessary time in the decomposition zone and all or part of it has been separated in accordance with the invention in said zone, a fraction $L_{n-1}$ of said suspension, comprising a maximum of 50% by volume and preferably no more than 30% by volume, is taken out and placed in a grading zone (C). From here the granular portion $L_g$ is extracted to form the coarse grain product $Al(OH)_3$ obtained according to the invention, while the other portion $L_c$ forming a suspension is removed from grading zone (C) and combined with the remaining fraction of the suspension circulating in the decomposition zone.

The suspension $L_n$ which comes from the decomposition zone without passing through the grading zone (C) is then subjected to solid-liquid separation at (D). The liquid phase $L_a$ is sent to the next section of the Bayer process, while the solid phase $S_a$, in accordance with the invention, forms the primer of aluminium trihydroxide of non-selected granulometry, which is recycled to at least one stage of the zone for the decomposition of the super-saturated solution of alkali metal aluminate.

The solid phase $S_a$ forming the primer of non-selected granulometry may be fed in that form into the solution of alkali metal aluminate to be decomposed, or may be fed in the form of a suspension previously prepared by dispersion in all or part of the alkali metal aluminate solution to be decomposed.

In a modified form a minor quantity of primer of aluminium trihydroxide is fed into the first stage of the decomposition zone, then the remaining quantity of primer is fed into the second stage of decomposition.

Generally, the greater quantity of aluminium trihydroxide primer introduced at the second stage of decomposition is at least equal to 70% by weight of all the recycled primer.

In the same modified embodiment, the solution of alkali metal aluminate to be decomposed is all fed into the first stage of the decomposition zone. However, it has also been found to be helpful to feed at least 20% by volume of the alkali metal aluminate solution to be decomposed into the first stage of the decomposition zone and to feed the remaining volume of said solution into the second stage of the zone.

In the above mentioned embodiment the maximum temperature used in the first stage of the decomposition zone is consequently chosen within the range from 65° to 80° C., and the maximum temperature in the second stage thereof within the range from 50° to 65° C.

FIGS. 2 and 3 illustrate two special forms of the process according to the invention.

In FIG. 2 the zone $(Z_S)$ for separating a fraction of the particularly fine solid particles of aluminium trihydroxide is formed at row $n-2$ of the decomposition stage.

The said separating zone is supplied by the whole flow $L_{n-3}$ of the suspension formed with a high content of dry material circulating in the decomposition zone.

The fraction $L_{S1}$, allowing for extraction of at least 5% of the total number of fine particles with a maximum diameter of 40 microns present in the circulating flow $L_{n-3}$, is mixed with the liquid phase La leaving the separating unit (D), before being recycled to a stage in the Bayer process (not shown).

The residual suspension $L_{S2}$ is returned to stage $(n-1)$ of the decomposition zone.

In FIG. 3 the zone $Z_{(S)}$ for separating a fraction of the particularly fine solid particles of aluminium trihydroxide is formed between group (B) decomposition stages $(n-p)$ and n, by arranging the grading device (C) so that the separating zone $Z_{(S)}$ is formed there. The separating zone $Z_{(S)}$ is then supplied by the flow L $(n-1)$, a partial fraction of the suspension formed with a high content of dry material circulating in the decomposition zone.

The residual suspension $L_{S2}$ is divided into two flows in the grading zone (C). The first flow $L_g$, containing the granular portion, consists of the $Al(OH)_3$ produced, with a large, even particle size. The other flow Lc is a suspension of $Al(OH)_3$ combined with the fraction of the suspension circulating in the decomposition zone but not subjected to grading.

The essential features of the invention will be understood better in the light of the example given below:

EXAMPLE 1

The decomposition of an industrial super-saturated solution of sodium aluminate is studied. The solution which has to be decomposed has been produced by action in the Bayer process at 245° C. on a mixture containing equal weights of an African bauxite and a French bauxite, which were of the following composition (percentages by weight):

|  | BAUXITES | |
|---|---|---|
|  | French | African |
| Loss of weight on combustion | 14.4 | 30.0 |
| $SiO_2$ | 7.0 | 1.0 |
| $Al_2O_3$ | 51.5 | 58.5 |
| $Fe_2O_3$ | 22.4 | 6.8 |
| $TiO_2$ | 2.7 | 3.5 |
| CaO | 1.8 | 0.1 |
| Organic C | 0.2 | 0.1 |

The super-saturated solution of sodium aluminate to be decomposed was of the following composition:

| | |
|---|---|
| caustic $Na_2O$ | 160 g/l |
| carbonated $Na_2O$ | 22 g/l |
| $Al_2O_3$ | 184 g/l |
| organic C | 15 g/l |
| chlorine | 5 g/l |
| oxalic carbon | 0.25 g/l |

A small proportion, namely 0.1 m3/h, of the sodium aluminate solution has been taken from a Bayer installation and placed in a pilot decomposing unit comprising:

(a) a 0.1 m3 tank representing group (A), in which the suspension with a high content of dry material is prepared by continuously putting all the primer into the presence of all the alkali metal aluminate solution to be decomposed (b) a cascade of 6 decomposers forming group (B), each with a volume of 1 m3 and an effective height of 1 m, agitated by three-bladed propellers of two levels, the first decomposer being supplied by a pump from the 0.1 m3 tank in group (A). The suspension is transferred from the first decomposer to the sixth decomposer in zone (B) by means of plunger tubes, which pick up the suspension halfway up the height of a tank and feed it to the next tank, this being done by degrees (c) a separating zone ($Z_S$) made up of:

c1—a cylindrical collar with a diameter of 0.33 m and a submerged height of 0.21 m, creating a calm zone; it is placed coaxially in the upper part of the last decomposer but one of group (B) and in the suction zone of the above-mentioned agitation c2—a volumetric pump which extracts from the separating zone ($Z_S$) the flow $L_{S1}$ taken from the upper part of said zone (d) a classifier (C), which is supplied with suspension with a high content of dry material to the extent of 30% of the flow rate of suspension going into the penultimate decomposer. The underflow $L_G$ is the aluminium trihydroxide produced, with a large, even particle size, while the overflow $L_C$ is returned to the last decomposer (e) a band filter (D) which is fed with suspension Ln by a pump from the last decomposer, the cake $S_a$ from the filter forming the primer which is recycled to the group (A) tank, intended for the preparation of the aluminium trihydroxide suspension with a high content of dry material.

The operating conditions of the pilot unit according to the invention are summarised in Table I below, and those used in patent application No. 82-12412 are given as a comparison.

TABLE I

| | | Invention | Control |
|---|---|---|---|
| TEMPERATURES | GROUP A | | |
| | Tank 0.1 m³ | 60° C. | 65° C. |
| | GROUP B | | |
| | Decomposer 1 | 60° C. | 65° C. |
| | Decomposer 2 | 59° C. | 64° C. |
| | Decomposer 3 | 58° C. | 63° C. |
| | Decomposer 4 | 57° C. | 62° C. |
| | Decomposer 5 | 56° C. | 61° C. |
| | Decomposer 6 | 55° C. | 60° C. |
| Flow rate of sodium aluminate solution to be decomposed: $L_d$ m³/h | | 0.1 | 0.1 |
| Quantity of dry primer introduced per litre of sodium aluminate: $S_a$ g/l | | 950 | 950 |
| Flow rate of fraction $L_{S1}$ containing the fine particles eliminated, in m³/h | | 0.012 | 0 |
| Flow rate of residual suspension $L_{S2}$ in m³/h | | 0.138 | 0.150 |
| Speed at which suspension goes back up into collar forming separating zone $Z_S$ in m/h | | 0.15 | no collar |
| Rate at which suspension $L_{n-1}$ is fed to classifier, in m³/h | | 0.045 | 0.045 |
| Flow rate of a decomposed liquor to dilute suspension in classifier, in m³/h | | 0.020 | 0.010 |
| Flow rate of underflow $L_G$ from classifier, in m³/h (average) | | 0.012 | 0.011 |
| Flow rate of suspension $L_C$ leaving classifier, in m³/h | | 0.053 | 0.044 |

The results obtained have been set out in table II below:

TABLE II

| | Invention | Control |
|---|---|---|
| % by weight of particles of Al(OH)₃ smaller than 45 microns in diameter, present in: | | |
| primer $S_a$ | | |
| mean value | 4 | 5 |
| maximum value | 10 | 20 |
| product $L_g$ | | |
| mean value | 1.5 | 2 |
| maximum value | 5 | 10 |
| Productivity for Al₂O₃, in kg precipitated per m³ of solution of sodium aluminate to be decomposed | 80 | 72 |
| Quantity (in g/l) of Al(OH)₃ in LS1 | | |
| mean value | 5 | 0 |
| maximum value | 8 | 0 |
| Loss as % by weight for $LS_1$ of total mass of Al(OH)₃ precipitated mean | 0.5 | 0 |
| Diameter for 50% of fine particles of Al(OH)₃ present in $LS_1$, expressed in microns | 13 | — |
| Alumina produced, in kg/hour | 7.95 | 7.2 |

Thus it will be seen that, if the method of the invention is applied as compared with that of patent application No. 82-12412, not only is the size of the particles of alumina produced considerably more even but there is also a marked increase in productivity, despite the loss of alumina corresponding to removal of fine particles through $L_{S1}$ and owing to a possible reduction in the temperature of decomposition.

We claim:

1. In a process for the decomposition of a supersaturated alkali metal aluminate solution produced by means of the Bayer process of alkaline attack on bauxites by the introduction of an amount of aluminum trihydroxide seed of non-selected particle size into a decomposition zone having "n" stages in a cascade configuration, such that a suspension having a proportion of dry matter of at least 700 g/l of alkali metal aluminate solution is produced in at least one of said "n" stages, the improvement comprising forming a separation zone ($Z_s$) between two of said "n" stages, supplying to said separation zone at least part of the flow of suspension circulating in the decomposition zone, extracting a fraction $L_{S1}$ from the suspension in said separation zone, said fraction $L_{S1}$ containing at least 5% of the total number of fine particles of aluminum trihydroxide having a maximum diameter of 40 microns which are present in the suspension circulating in the decomposition zone, reducing the number of fine particles in said fraction by at least 50%, and then recycling the fraction having the reduced number of fine particles to at least one stage of the Bayer process the process achieving the production of a product aluminum trihydroxide having a large even particle size of which 10% at most of the particles produced have their smallest dimension below 45 microns.

2. The process of claim 1, wherein the separation zone is substituted for one of the "n" stages of decomposition.

3. The process of claim 1, wherein when the separation zone is fed with part of the flow of the suspension circulating in the decomposition zone, the other part of said suspension is fed into the next decomposition stage.

4. The process of claim 1, wherein 5 to 40% of the total number of fine particles with a maximum diameter of 40 microns, present in the flow circulating in the decomposition zone is extracted.

5. The process of claim 1, wherein extraction of the fraction from the suspension in the separating zone is accomplished by a method selected from the group consisting of decanting, cycloning, filtering and centrifuging, used alone or in combination.

6. The process of claim 1, characterised in that reduction of the number of fine particles by at least 50% is accomplished by chemically agglomerating the fine particles, the agglomerated particles being adapted for use as primer at at least one stage of decomposition.

7. The process of claim 1, wherein 10 to 20% of the total number of fine particles with a maximum diameter of 40 microns present in the flow circulating in the decomposition zone is extracted.

8. The process of claim 1, wherein the separation zone is supplied with the whole flow of suspension circulating in the decomposition zone.

9. The process of claim 1, wherein the separation zone is formed in a grading zone (C).

* * * * *